(12) United States Patent
Vollenweider et al.

(10) Patent No.: US 11,826,760 B2
(45) Date of Patent: Nov. 28, 2023

(54) SELF-CONTAINED SLIDE PROCESSING UNIT FOR BIOLOGICAL SPECIMENS

(71) Applicant: Leica Microsystems CMS GmbH, Wetzlar (DE)

(72) Inventors: Meret Vollenweider, Aliso Viejo, CA (US); Stephen Eric Zingelewicz, Scotia, NY (US); Alex David Corwin, Niskayuna, NY (US); Kashan Ali Shaikh, Niskayuna, NY (US); Jessica Godin Karp, Niskayuna, NY (US); Michael Steven Lazare, Niskayuna, NY (US); David Andrew Shoudy, Niskayuna, NY (US); Christine Lynne Surrette, Niskayuna, NY (US)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 0 days.

(21) Appl. No.: 17/865,527

(22) Filed: Jul. 15, 2022

(65) Prior Publication Data
US 2022/0347691 A1 Nov. 3, 2022

Related U.S. Application Data

(63) Continuation of application No. 16/081,107, filed as application No. PCT/EP2017/056003 on Mar. 14, 2017, now Pat. No. 11,446,671.

(Continued)

(51) Int. Cl.
*B01L 1/00* (2006.01)
*B01L 9/00* (2006.01)
(Continued)

(52) U.S. Cl.
CPC .......... *B01L 9/527* (2013.01); *B01L 3/50273* (2013.01); *F04B 19/006* (2013.01); *G01N 1/312* (2013.01);
(Continued)

(58) Field of Classification Search
None
See application file for complete search history.

(56) References Cited

U.S. PATENT DOCUMENTS 5,647,364 A 7/1997 Schneider et al.
5,874,046 A 2/1999 Megerle
(Continued)

FOREIGN PATENT DOCUMENTS

JP 3023466 U 4/1996
JP 2007-333611 A 12/2007

*Primary Examiner* — Jyoti Nagpaul
(74) *Attorney, Agent, or Firm* — Leydig, Voit & Mayer, Ltd.

(57) ABSTRACT

A fluidic handling unit includes a baseplate, a fluidic inlet block, a fluidic outlet block, a pump in fluidic communication with the fluidic inlet block and the fluidic outlet block, a carrier control board in electrical communication with the pump, and a flow cell carrier comprising a microfluidic flow cell receiving area, wherein the flow cell carrier is configured to receive and retain the fluidic handling unit. A bottom surface of the fluidic handling unit is configured to complementary mate with a top surface of the flow cell carrier, or wherein a bottom surface of the flow cell carrier is configured to complementarily mate with a top surface of the fluidic handling unit.

16 Claims, 4 Drawing Sheets

Related U.S. Application Data

(60) Provisional application No. 62/314,830, filed on Mar. 29, 2016.

(51) Int. Cl.
  B01L 3/00   (2006.01)
  F04B 19/00  (2006.01)
  G01N 1/31   (2006.01)
  G01N 35/00  (2006.01)

(52) U.S. Cl.
  CPC ... *B01L 3/502715* (2013.01); *B01L 2200/025* (2013.01); *B01L 2200/027* (2013.01); *B01L 2200/028* (2013.01); *B01L 2300/023* (2013.01); *B01L 2300/024* (2013.01); *B01L 2300/0816* (2013.01); *B01L 2300/0822* (2013.01); *B01L 2400/0475* (2013.01); *B01L 2400/0481* (2013.01); *F04B 2203/0209* (2013.01); *G01N 35/00029* (2013.01)

(56) References Cited

U.S. PATENT DOCUMENTS

| | | |
|---|---|---|
| 5,955,028 A | 9/1999 | Chow |
| 6,358,387 B1 | 3/2002 | Kopf-Sill et al. |
| 7,430,930 B2 | 10/2008 | Zeller et al. |
| 8,828,321 B2 | 9/2014 | Shinohara et al. |
| 8,900,529 B2 | 12/2014 | Shaikh |
| 9,041,922 B1 | 5/2015 | Orfield et al. |
| 2001/0045358 A1 | 11/2001 | Kopf-Sill et al. |
| 2003/0214057 A1 | 11/2003 | Huang |
| 2004/0086428 A1 | 5/2004 | Loeffler et al. |
| 2004/0203055 A1 | 10/2004 | Kennedy et al. |
| 2004/0219661 A1 | 11/2004 | Chen et al. |
| 2009/0253163 A1 | 10/2009 | Xie et al. |
| 2011/0005932 A1 | 1/2011 | Jovanovich et al. |
| 2012/0015428 A1* | 1/2012 | Seale .................. F04B 19/006 415/73 |
| 2014/0248617 A1 | 9/2014 | Shaikh |
| 2014/0248618 A1 | 9/2014 | Shaikh |
| 2014/0356849 A1 | 12/2014 | Wikswo et al. |

* cited by examiner ably unified processing unit, which provides increased efficiency and throughput over prior art of biological specimen processing while also reducing error and improving accuracy. -->

SELF-CONTAINED SLIDE PROCESSING UNIT FOR BIOLOGICAL SPECIMENS

CROSS REFERENCE TO RELATED APPLICATIONS

This application is a continuation of U.S. patent application Ser. No. 16/081,107, filed on Aug. 30, 2018, which is a national stage entry of International Patent Application No. PCT/EP2017/056003, filed on Mar. 14, 2017, and claims benefit to U.S. Provisional Application No. 62/314,830, filed on Mar. 29, 2016. The aforementioned applications are hereby incorporated by reference herein.

FIELD

The present disclosure relates generally to the field of processing biological specimens, and more particularly methods and systems for increasing throughput of biological specimen processing.

BACKGROUND

The biotechnology, pharmaceutical, and medical industries regularly process and examine biological specimens for a number of purposes. Generally speaking, scientists, clinicians, and other diagnosticians collect and study biological specimens from subjects and utilize microscopic examination and other techniques to assess biological samples at the cellular and subcellular level. Numerous steps are typically involved in the process including biological sample collection, processing the samples, preparing microscope slides, staining, incubation, examination, re-testing or re-staining, collecting additional samples, and the like.

Despite the assistance of automated instruments, medical and laboratory personnel typically must be involved in numerous steps during the processing and examination of biological samples. Medical and laboratory personnel typically have to transport microscope slides in between various workstations in order to perform specific steps (e.g. coverslipping, staining, imaging, bleaching) and they carry out many steps themselves. Additionally, in some cases, once a biological specimen has undergone an initial examination, medical and laboratory personnel might determine that additional examination is required. For example, medical and laboratory personnel may require further sectioning of an existing biological sample or applying a different staining regimen or other protocol to a biological sample. This can result in multiple iterations of one or more of processing, sectioning, coverslipping, staining, examination, and the like. All of this can result in time delays, as well as tissue impairment. Further, even with automated instruments, significant human intervention is required.

The procedural complexity of processing and examining biological specimens in combination with numerous human interaction points makes the entire process low throughput, which can be problematic, particularly where high volumes of samples need to be handled, processed, and examined on a daily basis.

It therefore would be desirable to provide systems and methods that improve the throughput of biological specimen processing.

SUMMARY

In an embodiment, the present disclosure provides a fluidic handling unit. The fluidic handling unit includes a baseplate, a fluidic inlet block, a fluidic outlet block, a pump in fluidic communication with the fluidic inlet block and the fluidic outlet block, a carrier control board in electrical communication with the pump, and a flow cell carrier comprising a microfluidic flow cell receiving area, wherein the flow cell carrier is configured to receive and retain the fluidic handling unit. A bottom surface of the fluidic handling unit is configured to complementary mate with a top surface of the flow cell carrier, or wherein a bottom surface of the flow cell carrier is configured to complementarily mate with a top surface of the fluidic handling unit.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
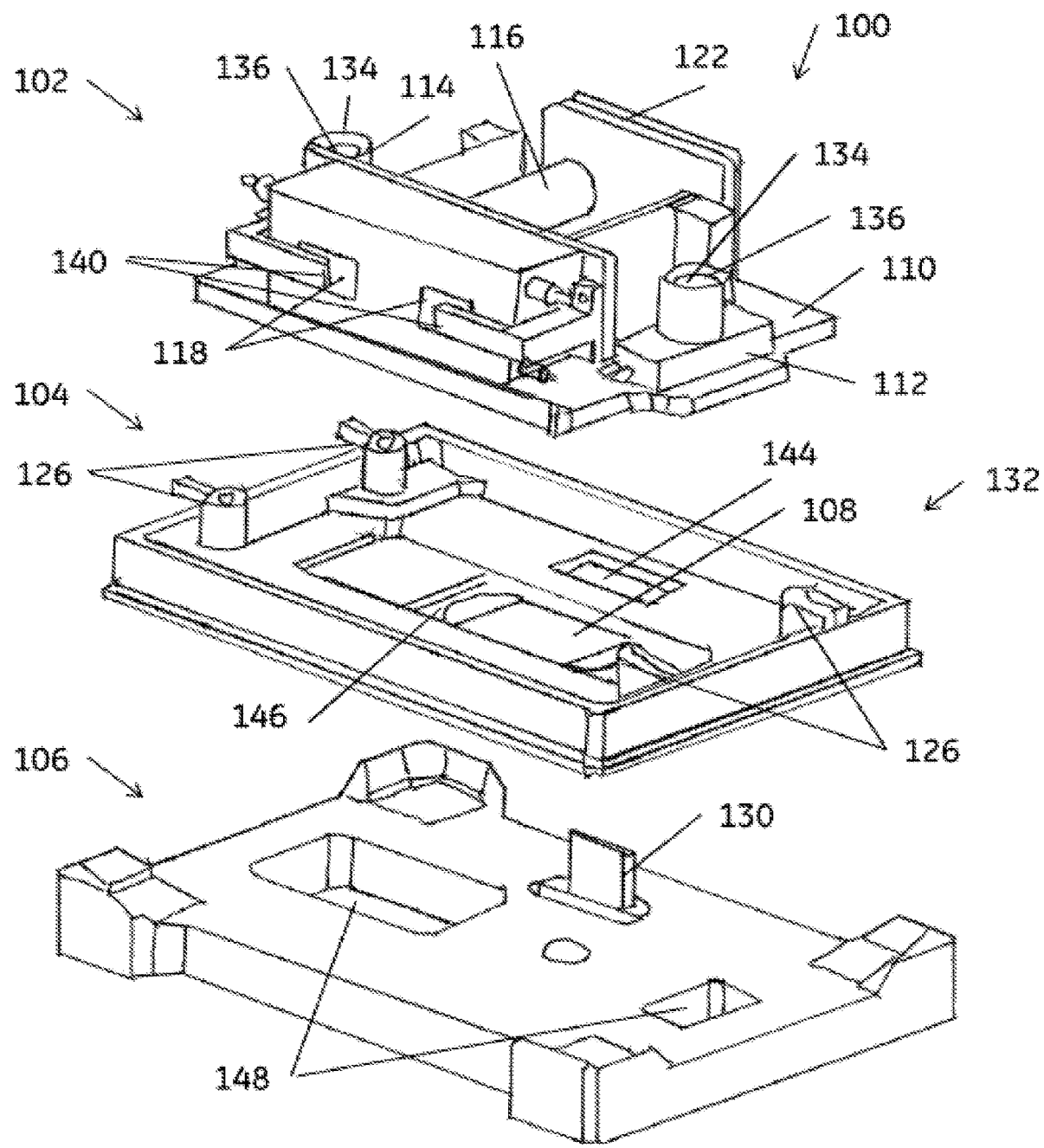
FIG. 1 shows an illustration of a biological specimen processing system in accordance with one example embodiment of the disclosure.

In one embodiment, a biological specimen processing system is provided which includes a fluidic handling unit comprising: a baseplate; a fluidic inlet block; a fluidic outlet block; a pump in fluidic communication with the fluidic inlet block and the fluidic outlet block; and a carrier control board in electrical communication with the pump.

In another embodiment, a biological specimen processing system is provided which includes a fluidic handling unit comprising: a baseplate; a fluidic inlet block; a fluidic outlet block; a first pump in fluidic communication with the fluidic inlet block; a second pump in fluidic communication with the fluidic outlet block; and a carrier control board in electrical communication with the first pump and the second pump.

In another embodiment, a biological specimen processing system is provided which includes an integrated slide processing unit comprising: a flow cell carrier comprising a microfluidic flow cell receiving area; and a fluidic handling unit comprising: a baseplate, a fluidic inlet block, a fluidic outlet block, a first pump in fluidic communication with the fluidic inlet block, a second pump in fluidic communication with the fluidic outlet block, a rotary encoder system arranged to monitor an angular motion of a rotating portion of the first pump and the second pump, and a carrier control board in electrical communication with the first pump, the second pump, and the rotary encoder system, wherein the flow cell carrier is configured to receive and retain the fluidic handling unit.

In another embodiment, a method for processing a biological specimen is provided which includes disposing a microfluidic flow cell in a microfluidic flow cell receiving area of a flow cell carrier; attaching the flow cell carrier to a fluidic handling unit, the fluidic handling unit comprising: a baseplate, a fluidic inlet block, a fluidic outlet block, a pump in fluidic communication with the fluidic inlet block and the fluidic outlet block, and a carrier control board in electrical communication with the pump; adding fluid to the fluidic inlet block; and pumping fluid through the microfluidic flow cell.

Referring now to the drawings, which are meant to be exemplary and not limiting, and wherein like elements are numbered alike. The detailed description is set forth with reference to the accompanying drawings illustrating examples of the disclosure, in which use of the same reference numerals indicates similar or identical items. Certain embodiments of the present disclosure may include elements, components, and/or configurations other than those illustrated in the drawings, and some of the elements, components, and/or configurations illustrated in the drawings may not be present in certain embodiments.

Example embodiments of the disclosure now will be described more fully hereinafter with reference to the accompanying drawings, in which exemplary embodiments are shown. This invention may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Systems and methods have been developed to help process biological specimens contained in a microfluidic flow cell. The present disclosure generally provides for an integrated slide processing unit having a flow cell carrier capable of holding a microfluidic flow cell and a fluidic handling unit that is attachable to the flow cell carrier and which interfaces with the microfluidic flow cell. The microfluidic flow cell can be a glass slide with an attached flow cell. The fluidic handling unit can include fluidic pumps, fluidic connections, integrated electronics, and processing software to facilitate processing of a biological specimen in the microfluidic flow cell.

The integrated slide processing unit can be used to apply and remove liquid reagents, such as those used in staining, washing, imaging, and bleaching to a biological specimen in a microfluidic flow cell without removing the microfluidic flow cell from the integrated slide processing unit. The integrated slide processing unit also allows optical access to the microfluidic flow cell without having to remove the microfluidic flow cell from the integrated slide processing unit.

Because the integrated slide processing unit is self-contained and removes the need for an external fluid resource, the integrated slide processing unit is easily moved in-between and used at various workstations in a processing pathway (e.g. coverslipping, staining, imaging, bleaching, incubation) with little effort, and enables an automated system to complete many rounds of staining, imaging, and bleaching in a fully automated manner. For full automation through multiple rounds, the automation system can include a microscope for imaging, a fluidic management system (e.g. a pipetting robot), and a robot to move the integrated slide processing unit in-between multiple workstations. In some embodiments, the integrated slide processing unit can serve as a smart slide holder and fluidic handler.

The integrated slide processing unit is a valuable tool on its own for research use as a low-cost alternative to larger staining instrumentation. In embodiments, multiple integrated slide processing units are used together in a large automated system where the integrated slide processing unit substantially improves biological specimen processing throughput compared to manual and batch processing methods by allowing for highly parallelized and automated execution of workflow steps.

Figure 2:
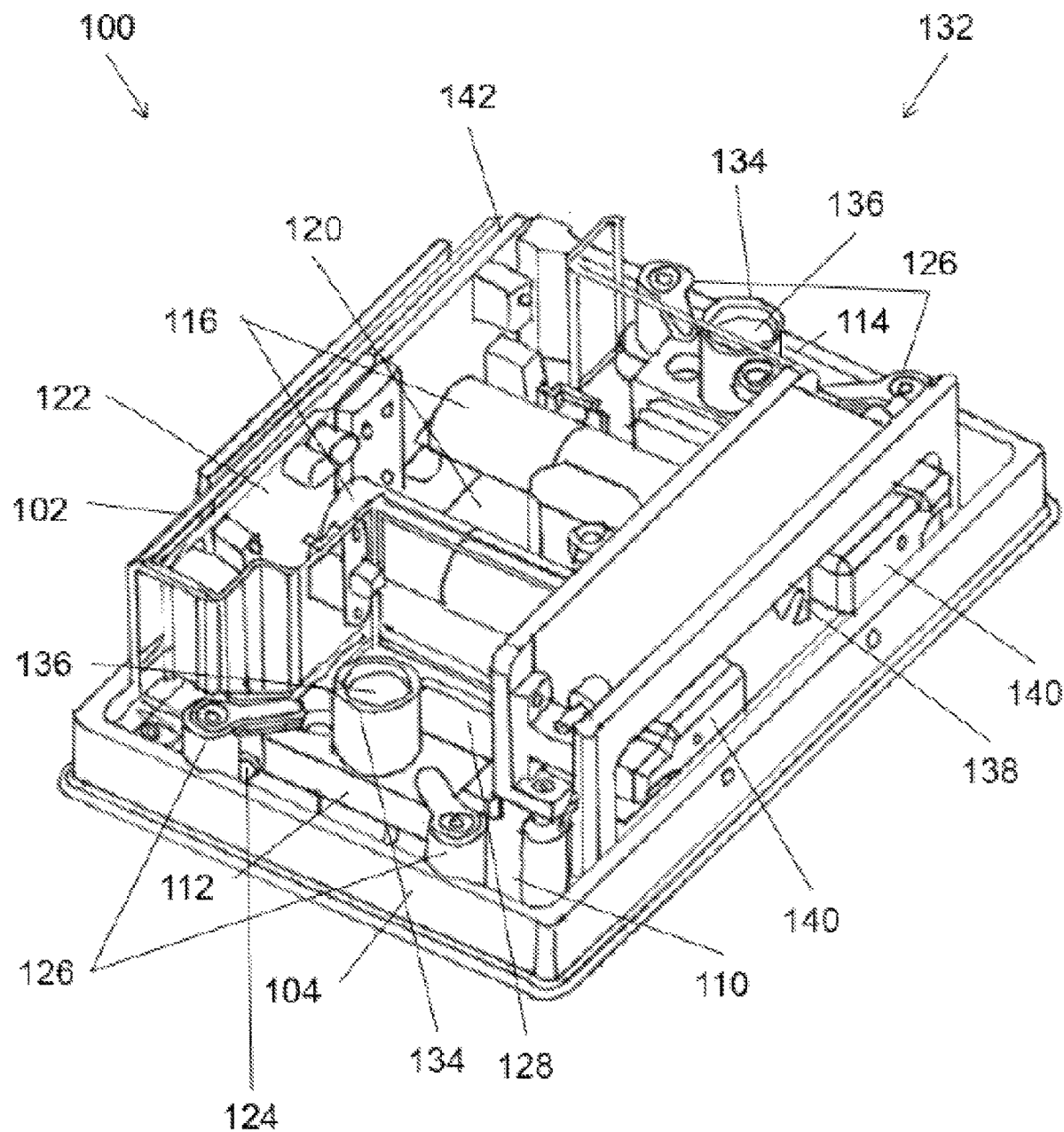
FIG. 2 shows an illustration of an integrated slide processing unit in accordance with one example embodiment of the disclosure.
Figure 3:
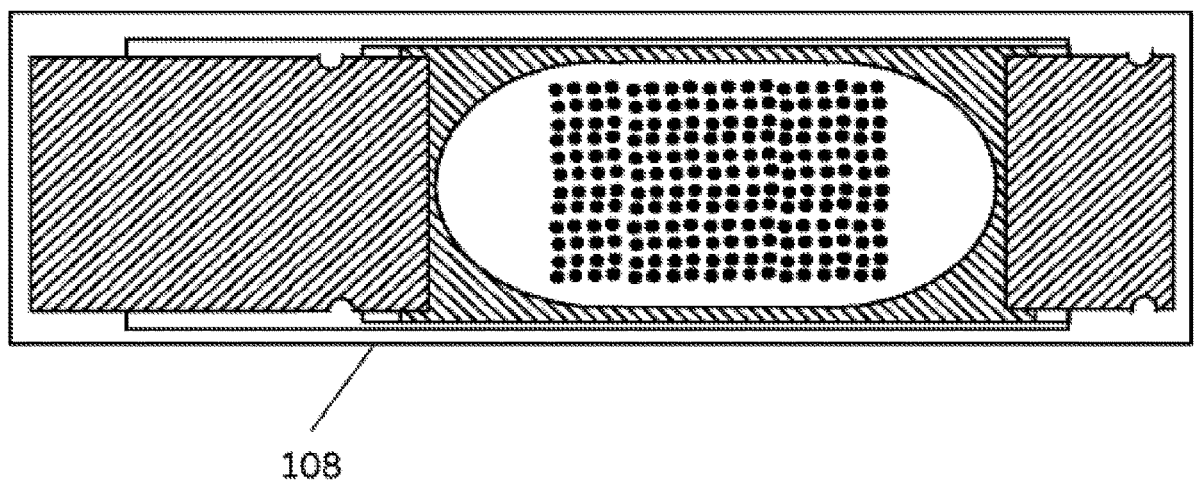
FIG. 3 shows a microfluidic flow cell in accordance with one example embodiment of the disclosure.

FIGS. 1-3 present various illustrations and views of a biological specimen processing system in accordance with one or more example embodiments of the disclosure. Referring now to FIGS. 1-3, the biological specimen processing system 100 can include a fluidic handling unit 102, a flow cell carrier 104, a receiver 106, and a microfluidic flow cell 108.

The fluidic handling unit 102 is generally configured to apply and remove liquid reagents to a microfluidic flow cell 108 having a biological sample disposed thereon or therein. The fluidic handling unit 102 can include a baseplate 110, a fluidic inlet block 112, a fluidic outlet block 114, a microfluidic pump 116, a rotary encoder system 118, a carrier control board 120, and a pump control board 122. The fluidic handling unit 102 can include one or more of each of the foregoing components. In some embodiments, the carrier control board 120 and the pump control board 122 are physically separate circuit boards. In some embodiments, the functionality of the carrier control board 120 and the pump control board 122 are combined into a same control board (e.g. the carrier control board 120 has both carrier control and pump control functionality).

The baseplate 110 generally serves as a support surface to which other elements of the fluidic handling unit 102 are attached (either directly or indirectly). The baseplate 110 can be made of any suitable material. Preferably, baseplate 110 is made of a material with enough strength and sturdiness to allow the baseplate 110 to support the other elements of the fluidic handling unit 102. The baseplate 110 can be made of, for example, a solid piece of metal (e.g. stainless steel), plastic (e.g. polystyrene or acrylic), glass, and the like.

The baseplate 110 can have a shape or configuration that allows for alignment of baseplate 110 with flow cell carrier 104, that allows baseplate 110 to be disposed in or on flow cell carrier 104, that allows a bottom surface of baseplate 110 to complementary mate with a top surface of flow cell carrier 104, or a combination thereof. For example, FIGS. 1 and 2 show baseplate 110 with grooves 124 that complement retention members 126 disposed on flow cell carrier 104 and show baseplate 110 having a shape that allows baseplate 110 to be disposed in flow cell carrier 104.

The baseplate 110 can have a form factor that matches the form factor of standard devices used in the biotechnology, pharmaceutical, and medical industry sectors. The baseplate 110 can have a form factor that matches the form factor of devices used for high-throughput medical diagnostics, drug screening, and other applications where chemical analysis processes are performed on multiple samples in parallel, such as a standard well plate or a microscope slide holder.

The baseplate 110 and flow cell carrier 104 can include one or more locating features that facilitate aligning baseplate 110 with flow cell carrier 104. The locating features can be formed on a surface of the baseplate 110 and a surface of the flow cell carrier 104. In one embodiment, the locating features include complementary grooves and projections that align a bottom surface of baseplate 110 with a top surface of flow cell carrier 104.

The baseplate 110 can include one or more apertures 128. The apertures can allow components and features of the fluidic handling unit 102 to interact with components and features that are not part of the fluidic handling unit 102. For example, baseplate 110 can include an electrical aperture that allows a connector or make-break spring-loaded contacts on a bottom side of carrier control board 120 to receive or electrically connect with circuit bus 130 when integrated slide processing unit 132 is placed down on receiver 106. Circuit bus 130 can be used to provide power and signals (e.g. processing instructions provided via an I2C protocol) to carrier control board 120.

Fluidic inlet block 112 generally serves to receive fluids and reagents for use in processing biological specimens contained in microfluidic flow cell 108. Fluidic inlet block 112 can be attached directly or indirectly to baseplate 110 using any suitable means known in the art such as screws, adhesive, and the like. Alternatively, fluidic inlet block 112 can be integrally formed with baseplate 110. Fluidic inlet block 112 can be made of any suitable material. Preferably, fluidic inlet block 112 is made of a fluidically impermeable material that confers durability to the fluidic inlet block 112 when the fluidic inlet block 112 is exposed to conditions used in processing biological specimens (e.g. a material that resists degradation in presence of certain liquids or reagents), but it need not be. Such suitable materials can include, for example, plastic (e.g. polystyrene or acrylic), glass, and the like.

Fluidic inlet block 112 can have an open end 134 and a fluid reservoir 136. The open end 134 allows for the insertion and removal of fluids into and from fluidic inlet block 112. For example, fluids can be inserted into and removed from fluidic inlet block 112 via open end 134 by manual or robotic pipetting, fluidic tubing, and the like. Fluid reservoir 136 of fluidic inlet block 112 can have any shape and dimensions suitable for holding fluids. In one example embodiment, fluid reservoir 136 is tapered. Fluid reservoir 136 can be in fluidic communication with microfluidic flow cell 108 via a fluidic network when fluidic handling unit 102 is placed down on flow cell carrier 104 having a microfluidic flow cell 108 disposed thereon or therein. Fluid reservoir 136 can also be in fluidic communication with pump 116 via a fluidic network. Such fluidic networks can include microchannels, tubing, and the like.

Fluidic outlet block 114 generally serves to collect fluids and reagents after they have been used in processing biological specimens contained in microfluidic flow cell 108. Fluidic outlet block 114 can be attached directly or indirectly to baseplate 110 using any suitable means known in the art such as screws, adhesive, and the like. Alternatively, fluidic outlet block 114 can be integrally formed with baseplate 110. Fluidic outlet block 114 can be made of any suitable material. Preferably, fluidic outlet block 114 is made of a fluidically impermeable material that confers durability to the fluidic outlet block 114 when the fluidic outlet block 114 is exposed to conditions used in processing biological specimens (e.g. a material that resists degradation in presence of certain liquids or reagents), but it need not be. Such suitable materials can include, for example, plastic (e.g. polystyrene or acrylic), glass, and the like.

Fluidic outlet block 114 can have an open end 134 and a fluid reservoir 136. The open end 134 allows for fluids (e.g. fluidic waste) to be removed from fluidic outlet block 114. For example, fluids can be removed from fluidic outlet block 114 via open end 134 by manual or robotic pipetting, fluidic tubing, and the like. Fluid reservoir 136 of fluidic outlet block 114 can have any shape and dimensions suitable for holding fluids. In one example embodiment, fluid reservoir 136 is tapered. Fluid reservoir 136 can be in fluidic communication with microfluidic flow cell 108 via a fluidic network when fluidic handling unit 102 is placed down on flow cell carrier 104 having a microfluidic flow cell 108 disposed thereon or therein. Fluid reservoir 136 can also be in fluidic communication with pump 116 via a fluidic network. Such fluidic networks can include microchannels, tubing, and the like.

The fluidic handling unit 102 can include one or more pumps 116. The one or more pumps 116 generally enable the flow of fluids across microfluidic flow cell 108 when fluidic handling unit 102 is placed down on flow cell carrier 104 having a microfluidic flow cell 108 disposed thereon or therein. The one or more pumps 116 can also be used to setup pressure differentials across microfluidic flow cell 108 for other operations such as coverslip pull-down during imaging. The one or more pumps 116 can be any fluidic pump suitable for such purposes. In one embodiment, the one or more pumps 116 are peristaltic pumps. In one embodiment, the one or more pumps 116 are microfluidic pumps. The one or more pumps 116 can be attached directly or indirectly to baseplate 110 using any suitable means known in the art such as screws, adhesive, and the like.

The one or more pumps 116 can be in fluidic communication with fluidic inlet block 112 and fluidic outlet block 114 via a fluidic network. Such fluidic networks can include microchannels, tubing, and the like. In one or more exemplary embodiments shown in FIGS. 1 and 2, fluidic handling unit 102 has two pumps 116. In these embodiments, one pump 116 is fluidically connected to fluidic inlet block 112 via tubing and the other pump 116 is fluidically connected to fluidic outlet block 114 via tubing.

The one or more pumps 116 can be in electromagnetic or electrical communication with carrier control board 120, pump control board 122, a computer or an electronics device disposed on the fluidic handling unit 102, a computer or an electronics device remote from the fluidic handling unit 102, a power source, or a combination thereof, using any suitable means known to those of ordinary skill in the art. The one or more pumps 116 can include wired, wireless, or other electrical connection structures (e.g. male/female electrical ports) that support electromagnetic or electrical communications. The one or more pumps 116 can communicate with other components by any conventional means such as through a wire (e.g. a copper wire) or wireless communication such as BLUETOOTH, Wi-Fi, cellular, and the like. The one or more pumps 116 can receive electricity used to power pumps 116 via the electromagnetic or electrical communications. The one or more pumps 116 can also receive pumping instructions (e.g. start, stop, change flow rate, etc.) or output relevant information (e.g. current pumping rate) via the electromagnetic or electrical communications.

In one embodiment, the one or more pumps 116 are in electrical communication with pump control board 122. The one or more pumps 116 can receive pumping instructions from, and output pumping information to, pump control board 122 via the electrical communication.

The fluidic handling unit 102 can include a rotary encoder system 118. The rotary encoder system 118 generally allows the biological specimen processing system 100 to monitor the angular position (e.g. track revolutions) of a shaft in a pump 116 used to pump fluids, which can then be used to provide information about the motion of the shaft (e.g. speed, distance, position, etc.), the rate of fluid flow, and error checking. The rotary encoder system 118 can use any suitable electro-mechanical devices that measure the angular position of a shaft, such as mechanical encoders, optical encoders, magnetic encoders, capacitive encoders, and the like.

In some embodiments, the rotary encoder system 118 is based on optical encoding. In some embodiments, the rotary encoder system 118 can include one or more optical encoder wheels 138 and one or more reflectance sensors 140. Generally, a rotary encoder system 118 based on optical encoding utilizes a light source and photodetector array to read an optical pattern that results from the position of the optical encoder wheels 138 at any one time. The rotary encoder system 118 can be attached directly or indirectly to baseplate 110 using any suitable means known in the art such as screws, adhesive, and the like.

The rotary encoder system 118 can be in electromagnetic or electrical communication with carrier control board 120, pump control board 122, a computer or an electronics device disposed on the fluidic handling unit 102, a computer or an electronics device remote from the fluidic handling unit 102, a power source, or a combination thereof, using any suitable means known to those of ordinary skill in the art. The rotary encoder system 118 can include wired, wireless, or other electrical connection structures (e.g. male/female electrical ports) that support electromagnetic or electrical communications. The rotary encoder system 118 can communicate with other components by any conventional means such as through a wire (e.g. a copper wire) or wireless communication such as BLUETOOTH, Wi-Fi, cellular, and the like. The rotary encoder system 118 can receive electricity used to power the rotary encoder system 118 via the electromagnetic or electrical communications. The rotary encoder system 118 can also receive instructions (e.g. start or stop monitoring) or output relevant information (e.g. position of optical encoder wheels 138) via the electromagnetic or electrical communications.

The one or more optical encoder wheels 138 can have an alternating striped pattern of light (e.g. white) and dark (e.g. black) spokes, slits, wedges, and the like. The number of spokes, slits, wedges, and the like can be any suitable number. In one embodiment, the one or more optical encoder wheels 138 have an alternating striped pattern of four white wedges and four dark wedges. The one or more optical encoder wheels 138 can be attached to a rotating portion of pumps 116. In one embodiment, optical encoder wheels 138 are stickers adhesively attached to a rotating portion of a pump head.

The one or more reflectance sensors 140 can include a light source such as an LED and a photodetector array. The one or more reflectance sensors 140 can be configured and arranged such that the light source emits light incident on optical encoder wheels 138 and the photodetector array detects light reflected from optical encoder wheels 138. The reflected light allows the one or more reflectance sensors 140 (or another remote device like carrier control board 120 or pump control board 122) to determine the position of the optical encoder wheels 138 at any one time. This positional information can be used to determine a flow rate, volume, and the like of a fluid pumped by pump 116.

In one embodiment, the one or more reflectance sensors 140 can detect the amount of infrared light reflected from optical encoder wheels 138 and generate a voltage proportional to the amount of detected light. The carrier control board 120, which can be in electrical communication with rotary encoder system 118, can analyze the voltage (e.g. analyze light-to-dark transitions) to track the rotational position of a rotating portion of pumps 116.

The fluidic handling unit 102 can include a carrier control board 120. The carrier control board 120 generally facilitates functioning of the biological specimen processing system 100. The carrier control board 120 can be a computer or a circuit board with microprocessor(s), memory, inputs/outputs, and other conventional features. In one embodiment, the carrier control board 120 has a microcontroller and corresponding circuitry for power regulation, pump control, I2C communication, optical encoder detection, temperature monitoring, and battery backup. The carrier control board 120 can be attached directly or indirectly to baseplate 110 using any suitable means known in the art such as screws, adhesive, and the like.

The carrier control board 120 can be in electromagnetic or electrical communication with the one or more pumps 116, rotary encoder system 118, pump control board 122, circuit bus 130, a computer or an electronics device disposed on the fluidic handling unit 102, a computer or an electronics device remote from the fluidic handling unit 102, a power source, or a combination thereof. The carrier control board 120 can include wired, wireless, or other electrical connection structures (e.g. male/female electrical ports) that support electromagnetic or electrical communications.

In one embodiment, carrier control board 120 is mounted on baseplate 110 and in electromagnetic or electrical communication with pump control board 122, rotary encoder system 118, and a remote computing device. In one embodiment, a bottom side of carrier control board 120 has a connector or make-break spring-loaded contacts to receive or electrically connect with circuit bus 130 when integrated slide processing unit 132 is placed down on receiver 106. In one embodiment, carrier control board 120 is mounted on baseplate 110 and in electromagnetic or electrical communication with circuit bus 130 when integrated slide processing unit 132 is placed down on receiver 106.

The carrier control board 120 can communicate with other components by any conventional means known in the art, such as through a wire (e.g. a copper wire), electrical ports, or wireless communication such as BLUETOOTH, Wi-Fi, cellular, and the like. The carrier control board 120 can receive electricity used to power the carrier control board 120 via the electromagnetic or electrical communications. The carrier control board 120 can also receive instructions (e.g. carry out certain processing steps) or output relevant information (e.g. completed biological specimen staining) via the electromagnetic or electrical communications.

The carrier control board 120 can be configured to sequence and control pump 116 operation, detect pump 116 rotations, enter and exit low power modes, drive any status lights (e.g. LEDs) that may be present on fluidic handling unit 102, detect when external power is connected, communicate with a host computer (e.g. over I2C), run real-time clocks or timers, run other application specific code, and the like. Carrier control board 120 can also include a battery or supercapacitor that allows the carrier control board 120 to remain powered for a period of time (e.g. several hours or several days) to maintain memory state and execute any critical operations to keep the carrier control board 120 history and memory state consistent in the event of a power failure, during robotic transit, while sitting in a stack or incubation station, and the like.

The fluidic handling unit 102 can include one or more pump control boards 122. The pump control boards 122 generally control the operation of pump 116. The pump control boards 122 can be a computer or a circuit board with microprocessor(s), memory, inputs/outputs, and other conventional features. The pump control boards 122 can be attached directly or indirectly to baseplate 110 using any suitable means known in the art such as screws, adhesive, and the like.

The pump control boards 122 can be in electromagnetic or electrical communication with the one or more pumps 116, carrier control board 120, a computer or an electronics device disposed on the fluidic handling unit 102, a computer or an electronics device remote from the fluidic handling unit 102, a power source, or a combination thereof. The pump control boards 122 can include wired, wireless, or other electrical connection structures (e.g. male/female electrical ports) that support the electromagnetic or electrical communications.

In one embodiment, pump control boards 122 are mounted on baseplate 110 and in electromagnetic or electrical communication with carrier control board 120 and the one or more pumps 116. The pump control boards 122 are typically mounted adjacent to the one or more pumps 116; however, they need not be and can be located elsewhere to help fit all components on baseplate 110.

The pump control boards 122 can communicate with other components by any conventional means known in the art, such as through a wire (e.g. a copper wire), electrical ports, or wireless communication such as BLUETOOTH, Wi-Fi, cellular, and the like. The pump control boards 122 can receive electricity used to power the pump control boards 122 via the electromagnetic or electrical communications. The pump control boards 122 can also receive instructions (e.g. carry out certain pumping operations) or output relevant information (e.g. current pumping rate) via the electromagnetic or electrical communications. In one embodiment, the pump control boards 122 are configured to receive an analog voltage from carrier control board 120 as an input and control the speed and direction of fluid pumped by pumps 116 based on this voltage.

The fluidic handling unit 102 can include a top cover 142. Top cover 142 generally serves to protect other components of the fluidic handling unit 102 (e.g. pumps or control boards) and is shaped to facilitate stacking of multiple integrated slide processing units 132. Top cover 142 can be made of any suitable material. Preferably, top cover 142 is made of a material with enough strength and sturdiness to protect other components of the fluidic handling unit 102 housed underneath top cover 142 and support multiple other integrated slide processing units 132 that may be stacked on top of top cover 142. Top cover 142 can be made of, for example, a solid piece of metal (e.g. stainless steel), plastic (e.g. polystyrene or acrylic), glass, and the like. Top cover 142 can be attached directly or indirectly to baseplate 110 using any suitable means known in the art such as screws, adhesive, and the like.

Top cover 142 can have a shape or configuration that allows for alignment of a bottom surface of flow cell carrier 104 to complementary mate with a top surface of top cover 142. Top cover 142 and flow cell carrier 104 can include one or more locating features that facilitate aligning a top surface of top cover 142 with a bottom surface of flow cell carrier 104. The locating features can be formed on a surface of the top cover 142 and a surface of flow cell carrier 104. In one embodiment, the locating features include complementary grooves and projections that align a top surface of top cover 142 with a bottom surface of flow cell carrier 104.

Flow cell carrier 104 generally serves as a support structure for microfluidic flow cell 108 and fluidic handling unit 102. Flow cell carrier 104 is generally configured to receive a microfluidic flow cell 108 having a biological sample disposed thereon or therein, mate with and attach to fluidic handling unit 102 to form an integrated slide processing unit 132, and mate with receiver 106.

Flow cell carrier 104 can be made of any suitable material. Preferably, flow cell carrier 104 is made of a material with enough strength and sturdiness to allow flow cell carrier 104 to support microfluidic flow cell 108 and fluidic handling unit 102. Flow cell carrier 104 can be made of, for example, a solid piece of metal (e.g. stainless steel), plastic (e.g. polystyrene or acrylic), glass, and the like.

Flow cell carrier 104 can have a shape or configuration that allows for alignment of baseplate 110 with flow cell carrier 104, that allows baseplate 110 to be disposed in or on flow cell carrier 104, that allows a bottom surface of baseplate 110 to complementary mate with a top surface of flow cell carrier 104, or a combination thereof. For example, FIGS. 1 and 2 show baseplate 110 with grooves 124 that complement retention members 126 disposed on flow cell carrier 104 and show baseplate 110 having a shape that allows baseplate 110 to be disposed in flow cell carrier 104.

Flow cell carrier 104 and baseplate 110 can include one or more locating features that facilitate aligning baseplate 110 with flow cell carrier 104. The locating features can be formed on a surface of baseplate 110 and a surface of flow cell carrier 104. In one embodiment, the locating features include complementary grooves and projections that align a bottom surface of baseplate 110 with a top surface of flow cell carrier 104.

Flow cell carrier 104 can have a shape or configuration that allows for alignment of microfluidic flow cell 108 with flow cell carrier 104, that allows microfluidic flow cell 108 to be disposed in or on flow cell carrier 104, that allows a bottom surface of microfluidic flow cell 108 to complementary mate with a top surface of the flow cell carrier 104, or a combination thereof. The flow cell carrier 104 can have a microfluidic flow cell receiving area 146. In one embodiment illustrated in FIG. 1, microfluidic flow cell 108 is disposed in a recess of flow cell carrier 104 that is dimensioned to match or correspond to the dimensions of microfluidic flow cell 108.

The flow cell carrier 104 and microfluidic flow cell 108 can include one or more locating features that facilitate aligning microfluidic flow cell 108 with flow cell carrier 104. The locating features can be formed on a surface of the microfluidic flow cell 108 and a surface of the flow cell carrier 104.

Flow cell carrier 104 can include one or more apertures 144. In some embodiments, apertures 144 can allow components and features of fluidic handling unit 102 to interact with components and features that are not part of fluidic handling unit 102. For example, apertures 144 can be positioned to allow a connector or make-break spring-loaded contacts on a bottom side of carrier control board 120 of fluidic handling unit 102 to receive or electrically connect with circuit bus 130 when integrated slide processing unit 132 is placed down on receiver 106. In some embodiments, apertures 144 can be positioned to allow visual or optical access of microfluidic flow cell 108 when microfluidic flow cell 108 is disposed in a microfluidic flow cell receiving area 146 of flow cell carrier 104. For example, apertures 144 can be positioned in a bottom wall of flow cell carrier 104 such that they correspond to a microfluidic flow cell receiving area 146 or a portion thereof, thereby allowing visual observation of microfluidic flow cell 108 by an inverted microscope when integrated slide processing unit 132 having a microfluidic flow cell 108 disposed therein is placed down on receiver 106.

Flow cell carrier 104 can include one or more retention members 126. Retention members 126 generally facilitate keeping fluidic handling unit 102 in a mated position with flow cell carrier 104 and generally hold fluidic handling unit 102 firmly against microfluidic flow cell 108 when microfluidic flow cell 108 is disposed in a microfluidic flow cell receiving area 146 of flow cell carrier 104 (and when fluidic handling unit 102 is mated with flow cell carrier 104), thereby ensuring a good fluidic seal between fluidic handling unit 102 and microfluidic flow cell 108. Retention members 126 can be attached directly or indirectly to flow cell carrier 104 using any suitable means known in the art such as screws, adhesive, and the like. Retention members 126 can be made of any suitable material such as, for example, plastic, metal, and the like.

Retention members 126 can be, for example, spring-loaded plastic tabs. In one exemplary embodiment, the spring-loaded plastic tabs are biased in a retention position and are operable to keep fluidic handling unit 102 in a mated position with flow cell carrier 104 by physically preventing the separation of fluidic handling unit 102 from flow cell carrier 104. To separate fluidic handling unit 102 from flow cell carrier 104 when held together by spring-loaded plastic tabs, an arm portion of the plastic tab can be rotated to an unlocked position.

The biological specimen processing system 100 can include a receiver 106. The receiver 106 is generally a mechanical stage or cradle for holding and receiving an integrated slide processing unit 132. The receiver 106 can be part of a processing or analytical system routinely used in the biotechnology, pharmaceutical, and medical industry sectors, such as a coverslipping station, staining station, bleaching station, fluidic manipulation station (e.g. add or remove solutions), imaging station, incubation station, and the like.

Receiver 106 can have a shape or configuration that allows for alignment of integrated slide processing unit 132 with receiver 106, that allows integrated slide processing unit 132 to be disposed in or on receiver 106, that allows a bottom surface of integrated slide processing unit 132 to complementary mate with a top surface of receiver 106, or a combination thereof. Receiver 106 and integrated slide processing unit 132 can include one or more locating features that facilitate aligning integrated slide processing unit 132 with receiver 106. The locating features can be formed on a surface of the integrated slide processing unit 132 and a surface of the receiver 106. For example, FIG. 1 shows receiver 106 having a shape that complements and allows integrated slide processing unit 132 to be disposed in receiver 106.

Receiver 106 can include one or more apertures 148. In some embodiments, apertures 148 can be positioned to allow visual or optical access of microfluidic flow cell 108 when an integrated slide processing unit 132 having a microfluidic flow cell 108 disposed therein is placed down on receiver 106. For example, apertures 148 can be positioned in receiver 106 such that they correspond to a microfluidic flow cell receiving area 146 or a portion thereof, thereby allowing visual observation of microfluidic flow cell 108 by an inverted microscope when integrated slide processing unit 132 having a microfluidic flow cell 108 disposed therein is placed down on receiver 106. In some embodiments, apertures 148 can allow components and features of the integrated slide processing unit 132 to interact with components and features that are not part of the integrated slide processing unit 132 or the receiver 106. For example, apertures 148 can be positioned to allow a connector or make-break spring-loaded contacts in the integrated slide processing unit 132 to receive or electrically connect with a circuit bus or other electrical connection extending from below receiver 106 and through apertures 148 when integrated slide processing unit 132 is placed down on receiver 106. In some embodiments, apertures 148 can be positioned to allow for the illumination of a microfluidic flow cell 108 when an integrated slide processing unit 132 having a microfluidic flow cell 108 disposed therein is placed down on receiver 106. For example, apertures 148 can be positioned in receiver 106 such that they correspond to a light source and a microfluidic flow cell receiving area 146 or a portion thereof, thereby allowing the light source to illuminate microfluidic flow cell receiving area 146 or a portion thereof. The source of the illumination can be light-emitting diodes ("LEDs") or other light sources integrated into the receiver 106 or mounted externally. Illumination can be used for a variety of purposes such as enhanced observation of a biological specimen or causing a biochemical reaction.

Receiver 106 can include one or more circuit buses 130 positioned therein or extending therethrough. The one or more circuit buses 130 can generally be used to provide power and signals (e.g. processing instructions provided via an I2C protocol) to carrier control board 120 when integrated slide processing unit 132 is placed down on receiver 106.

The biological specimen processing system 100 can include a microfluidic flow cell 108. The microfluidic flow cell 108 is generally configured to receive and hold a biological sample, and can interface with fluidic handling unit 102 to control the delivery of one or more fluids to a biological sample. Exemplary microfluidic flow cells 108 suitable for use in the present disclosure include, but are not limited, the microfluidic devices disclosed in U.S. Pat. No. 8,900,529, U.S. Patent Publication No. 2014/0248617, and U.S. Patent Publication No. 2014/0248618, the contents of which are incorporated herein in their entirety.

Microfluidic flow cell 108 can be formed from a glass slide typically used in standard microscopy (e.g. a standard microscope glass slide), but it need not be. In one embodiment, the microfluidic flow cell 108 can have a sealed reaction chamber that is created by adhesively attaching a flow cell to a slide.

In one embodiment, integrated slide processing unit 132 encapsulates microfluidic flow cell 108 having a biological sample disposed therein or thereon, and provides both electrical and mechanical means of acting on microfluidic flow cell 108. The biological sample can include any suitable biological sample such as cells, biological fluids (e.g. blood), and the like. For example, microfluidic flow cell 108 can have deparaffinized formalin-fixed paraffin-embedded (FFPE) tissue or cell pellet sections baked to a standard microscope glass slide or an optically transparent microscope slide. In some embodiments, the slide can be conditioned with probes to capture analytes of interest such as antibodies, cells, and other biological samples.

In one embodiment, integrated slide processing unit 132 can contain optical encoder wheels 138 on pump 116 motor cylinders and reflectance sensors 140 for tracking pump revolutions and error checking. The reflectance sensors 140 can be used in a volume commanded configuration, where a flow rate is commanded and the protocol step completes only when the target volume has been delivered (as opposed to commanding a flow rate and waiting the corresponding time required to deliver the volume). The reflectance sensors 140 can also be used in a closed-loop PID configuration to keep the flow rate constant (by boosting the actuation voltage to the pumps 116 as appropriate) to mitigate heat build-up inside the motor, which adds friction and typically would result in a slower flow rate than commanded.

In one embodiment, integrated slide processing unit 132 can hold its own calibration and configuration values using a micro-controller's non-volatile memory (e.g. a microcontroller on carrier control board 120). This can include calibration factors for pumps 116 as well as a unique serial number identifying the integrated slide processing unit 132 (or any component therein) plus versioning information relating to the firmware. The calibration parameters may correlate internal actuation voltages to an intended flow rate or volume per revolution.

In one embodiment, integrated slide processing unit 132 can track device usage history and maintain this information in non-volatile memory. For example, integrated slide processing unit 132 can track total pump 116 rotations and/or total runtime to know when it is time to recalibrate the integrated slide processing unit 132 or when the pump 116 tubing has reached its end of life and needs to be replaced.

In one embodiment, integrated slide processing unit 132 can be commanded externally through a connection (wired or wireless) or via integrated controls (e.g. a button the user presses to signal an action is complete). Information including but not limited to processor status, version number, and process step from the integrated slide processing unit 132 can be presented either externally (though a wired or wireless connection) or via an integrated display (LEDs, LCD screen, etc.).

In one embodiment, integrated slide processing unit 132 can be programmed with a sequence of steps in a stored program and can keep track of processing details as it executes (e.g. can log temperature during operation as well as voltages to various pumps 116 as it autonomously runs a fluidic pumping protocol or other process step).

In one embodiment, integrated slide processing unit 132 can be commanded based on location as detected via either electrical or RF connections. For example, the integrated slide processing unit 132 can be programmed to wait to start a staining operation until it has been moved to a particular location (for example an incubation station in the form of a plate hotel). Once it detects that it is in the proper location it will then begin executing a stored program or sequence of the program. The integrated slide processing unit 132 can also be barcoded to be tracked for the purpose of location detection and inventory management.

In one embodiment, the integrated slide processing unit 132 can be commanded based on temperature. For example, if it is to be put in an incubation chamber it may utilize an on board thermometer to wait until temperature has risen to a predetermined level before starting execution of a stored program.

In one embodiment, the integrated slide processing unit 132 can be commanded based on other sensors that can be included with integrated slide processing unit 132 such as pressure sensors, flow sensors, nanodrop sensors, leak sensors and the like. In one embodiment, detection of a leak by a leak sensor can trigger the integrated slide processing unit 132 to take protective measures and perform error handling. The leak sensor can use any sensing mechanism known to those of ordinary skill and can include, for example, a capacitive leak sensing mechanism.

In one embodiment, the integrated slide processing unit 132 can include a heater, which can be used to change kinetics of operations and speed up process steps.

In one embodiment, the integrated slide processing unit 132 can include sensors such as temperature sensors, flow sensors, pressure sensors, or sensors for monitoring voltage/current to monitor the status of a biological sample, the environment, or the integrated slide processing unit 132 itself. Feedback from these sensors can trigger the integrated slide processing unit 132 to take a specific action or actions. For example, a flow rate can be adjusted in response to readings from a pressure sensor to avoid excess deflection of a flow cell during operation.

In one embodiment, power can be supplied to integrated slide processing unit 132 through an on board battery (chemical, super capacitor, etc.), via connections to an external power supply (wired, make or break, etc.), or both (external power with an on board battery to maintain power during disconnect operations).

In one embodiment, integrated slide processing unit 132 can contain an on-board energy storage device (super capacitor, battery, etc.) and associated smart power management circuitry to detect loss of power and enter a power-down mode to preserve battery power, with the option to resume a pumping protocol once external power is reconnected. Alternatively, the on-board energy storage may act as the primary power source during specific protocol steps that do not require more energy than is stored (for example, the integrated slide processing unit 132 may be moved to a non-powered receiver/hotel during an incubation time in which pumping steps are not required, or for running short pumping steps that do not fully deplete the battery). In the event of loss of backup power (battery depleted), the integrated slide processing unit 132 can additionally store its current state to non-volatile memory to help future diagnosis of the integrated slide processing unit 132 and biological sample state to determine how to recover from the power-loss.

In one embodiment, integrated slide processing unit 132 can allow physical access to microfluidic flow cell 108, which can be used for the application of heating/cooling (or other action mechanisms such as ultrasonic agitation), or for the introduction of sensors.

In one embodiment, integrated slide processing unit 132 can be configured to accommodate one or more microfluidic flow cells 108. For example, a single slide processing unit 132 can be configured to accommodate 1, 2, 3, 4, 5, 6, 7, 8, 9, 10, or more microfluidic flow cells 108. When integrated slide processing unit 132 is configured to accommodate two or more microfluidic flow cells 108, integrated slide processing unit 132 can include one or more flow cell carriers 104. In one embodiment, one flow cell carrier 104 can be configured to accommodate multiple microfluidic flow cells 108. In another embodiment, multiple flow cell carriers 104 each holding a single microfluidic flow cell 108 can be used. When integrated slide processing unit 132 is configured to accommodate two or more microfluidic flow cells 108, the design of integrated slide processing unit 132 can be adjusted accordingly. For example, an integrated slide processing unit 132 configured to accommodate two microfluidic flow cells 108 can include one or two pumps 116 having either fully shared fluidics or integrated valves to perform fluidic routing between the pumps 116 and the microfluidic flow cells 108. As an alternative example, an integrated slide processing unit 132 configured to accommodate two microfluidic flow cells 108 can include four pumps 116, the first two pumps 116 being dedicated to the first microfluidic flow cell 108 and the other two pumps 116 being dedicated to the second microfluidic flow cell 108.

Figure 4:
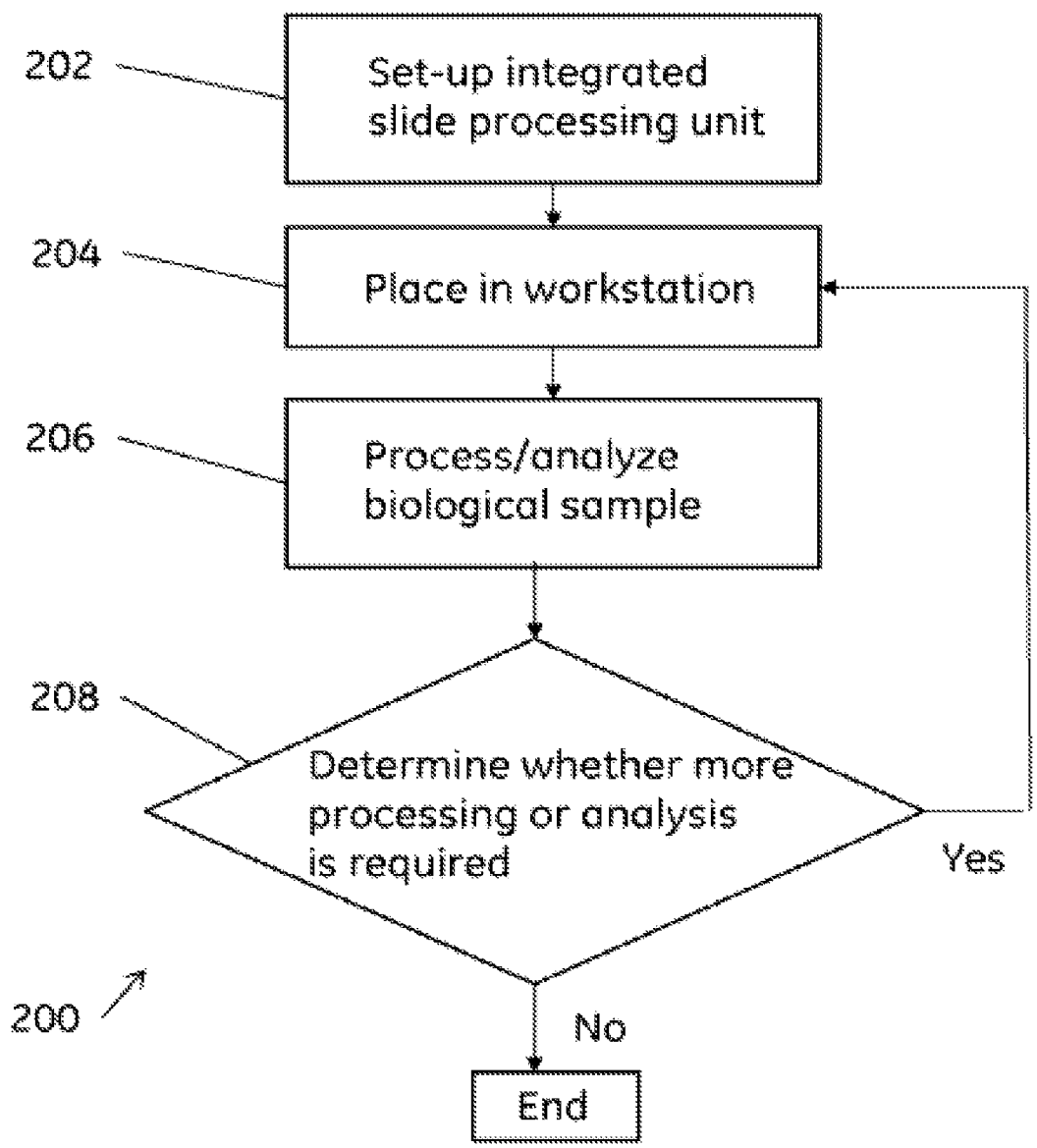
FIG. 4 shows a flowchart of a method for processing a biological specimen in accordance with one example embodiment of the disclosure.

FIG. 4 is a flowchart of a method for processing a biological specimen 200 in accordance with one example embodiment of the disclosure. The method generally comprises assembling an integrated slide processing unit 132, placing the integrated slide processing unit 132 in a workstation, processing and analyzing a biological specimen contained in a microfluidic flow cell 108 disposed within integrated slide processing unit 132, and repeating one or more steps of the method until the biological specimen no longer requires any processing.

In step 202, microfluidic flow cell 108 is disposed in a microfluidic flow cell receiving area 146 of flow cell carrier 104. Fluidic handling unit 102 is then mated (e.g. placed on top of) with flow cell carrier 104, forming an integrated slide processing unit 132. Retention members 126 are then moved into a retention position that facilitates keeping fluidic handling unit 102 in a mated position with flow cell carrier 104 and generally holds fluidic handling unit 102 firmly against microfluidic flow cell 108.

In step 204, the securely fastened integrated slide processing unit 132 is placed in an appropriate workstation (e.g. a staining station, imaging station, bleaching station, incubation station, robotic handling station, etc.). Because the integrated slide processing unit 132 is self-contained, the integrated slide processing unit 132 can be transported to various workstations for processing and imaging manually, by means of a robot (e.g. in an automated manner), or a combination thereof.

In step 206, a biological sample disposed on or in microfluidic flow cell 108 is processed, analyzed, or both. Processing generally encompasses methods conventionally used to prepare a biological sample for analysis, such as loading/removing reagents, washing, bleaching, incubating, and the like. Analysis generally encompasses conventional methods used study a biological sample, such as viewing or imaging a biological sample using a microscope (e.g. optical interrogation of a biological sample). Typically, integrated slide processing unit 132 responds to processing and analysis commands that can originate from, for example, a carrier control board 120 or a remote device. In some embodiments, signals can be passed to carrier control board 120 which then triggers the start of the appropriate action on the slide (for example, running a pump and flowing a liquid reagent over the slide).

Processing typically begins by loading appropriate fluids and reagents into an inlet (e.g. fluidic inlet block 112) of the integrated slide processing unit 132, but it need not begin with this action. For example, incubation of a biological sample or coverslipping may not require any additional fluids or reagents. Fluids and reagents can be used for staining, binding, washing, imaging, bleaching, and the like, of biological specimens disposed on or in microfluidic flow cell 108. The fluids and reagents can also be used to remove portions of a biological specimen (e.g. by lysis or digestion), and can allow the removed biological specimen portion to be recovered for later processing (including but not limited to processing for next generation sequencing). Once flown through microfluidic flow cell 108, the fluids and reagents can be removed from an outlet (e.g. fluidic out block 114) of the integrated slide processing unit 132.

The loading and removal of fluids and reagents can be accomplished manually (e.g. a user pipettes the fluids and reagents into and out of the inlets and outlets respectively), or in an automated fashion (e.g. a pipetting robot dispenses and aspirates fluids and reagents into and out of the inlets and outlets respectively). When a robotic liquid handler (e.g. pipetting robot) is involved, the integrated slide processing unit 132 can synchronize its operation with the robotic liquid handler either by connecting directly to a workstation (e.g. a microscope) or by communicating with a separate control program in communication with the robotic liquid handler.

For the processing actions that require fluids and reagents, once the appropriate fluids and reagents are in the inlets and outlets of the integrated slide processing unit 132, the one or more pumps 116 of the integrated slide processing unit 132 can be used to introduce, agitate, flow, and remove liquid reagents and samples in a controlled manner from microfluidic flow cell 108. The one or more pumps 116 can also be used to adjust the pressure of the microfluidic flow cell 108 enclosing the biological sample, or to adjust the dimensions of the microfluidic flow cell 108 itself when the microfluidic flow cell 108 includes an adhesively attached flow cell.

In step 208, the method for processing a biological specimen 200 determines whether the biological specimen requires any additional processing and analysis. If so, steps 204, 206, and 208 are repeated until it is determined that the biological specimen does not require any additional processing and analysis. Once the biological specimen does not require any additional processing and analysis, the method ends.

Publications cited herein and the materials for which they are cited are specifically incorporated by reference. Modifications and variations of the methods and devices described herein will be obvious to those skilled in the art from the foregoing detailed description. Such modifications and variations are intended to come within the scope of the appended claims.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:
1. A fluidic handling unit comprising:
a baseplate;
a fluidic inlet block;
a fluidic outlet block;

a pump in fluidic communication with the fluidic inlet block and the fluidic outlet block;

a carrier control board in electrical communication with the pump; and a flow cell carrier comprising a microfluidic flow cell receiving area, wherein the flow cell carrier is configured to receive and retain the fluidic handling unit, wherein a bottom surface of the fluidic handling unit is configured to complementary mate with a top surface of the flow cell carrier, or wherein a bottom surface of the flow cell carrier is configured to complementarily mate with a top surface of the fluidic handling unit.

2. The fluidic handling unit of claim 1, wherein the flow cell carrier comprises one or more retention members, and wherein the one or more retention members are operable to fasten the fluidic handling unit to the flow cell carrier.

3. The fluidic handling unit of claim 1, wherein the bottom surface of the fluidic handling unit is configured to complementary mate with the top surface of the flow cell carrier.

4. The fluidic handling unit of claim 1, wherein the bottom surface of the flow cell carrier is configured to complementary mate with a top surface of a receiver.

5. The fluidic handling unit of claim 1, wherein a bottom wall of the flow cell carrier has an optical aperture corresponding to the microfluidic flow cell receiving area or a portion thereof, and wherein the optical aperture is arranged to allow optical access of a microfluidic flow cell when the microfluidic flow cell is disposed in the microfluidic flow cell receiving area.

6. The fluidic handling unit of claim 1, wherein a bottom wall of the flow cell carrier has an electrical aperture, and wherein the electrical aperture is arranged to allow electrical contact between the fluidic handling unit and the receiver when the fluidic handling unit is disposed in the flow cell carrier and the flow cell carrier is disposed in the receiver.

7. The fluidic handling unit of claim 6, wherein the fluidic handling unit comprises spring-loaded electrical contacts, and wherein the spring-loaded electrical contacts are arranged to form an electrical connection between the fluidic handling unit and the receiver when the fluidic handling unit is disposed in the flow cell carrier and the flow cell carrier is disposed in the receiver.

8. The fluidic handling unit of claim 1, wherein the fluidic inlet block and the fluidic outlet block each comprise an open reservoir having a funnel section.

9. The fluidic handling unit of claim 1, wherein the fluidic inlet block and the fluidic outlet block are each arranged to form a fluidic connection with a microfluidic flow cell when the microfluidic flow cell is disposed in the microfluidic flow cell receiving area and when the fluidic handling unit is disposed in the flow cell carrier.

10. The fluidic handling unit of claim 1, further comprising a rotary encoder system arranged to monitor an angular motion of a rotating portion of the pump, wherein the carrier control board is in electrical communication with the rotary encoder system.

11. The fluidic handling unit of claim 10, wherein the rotary encoder system comprises:

an optical encoder wheel attached to the rotating portion of the pump; and a reflectance sensor arranged to capture infrared reflection off of the optical encoder wheel.

12. The fluidic handling unit of claim 1, further comprising a microfluidic flow cell disposed in the microfluidic flow cell receiving area.

13. A biological specimen processing system comprising:
a fluidic handling unit comprising:
a baseplate;
a fluidic inlet block;
a fluidic outlet block;
a pump in fluidic communication with the fluidic inlet block;
a carrier control board in electrical communication with the pump; and
a rotary encoder system arranged to monitor an angular motion of a rotating portion of the pump, wherein the carrier control board is in electrical communication with the rotary encoder system, and wherein the rotary encoder system comprises:
an optical encoder wheel attached to the rotating portion of the pump; and
a reflectance sensor arranged to capture infrared reflection off of the optical encoder wheel.

14. A method for processing a biological specimen comprising:

disposing a microfluidic flow cell in a microfluidic flow cell receiving area of a flow cell carrier;

attaching the flow cell carrier to a fluidic handling unit, the fluidic handling unit comprising:
a baseplate,
a fluidic inlet block,
a fluidic outlet block,
a pump in fluidic communication with the fluidic inlet block and the fluidic outlet block, and
a carrier control board in electrical communication with the pump, and monitoring an angular motion of a rotating portion of the pump;

adding fluid to the fluidic inlet block; and pumping fluid through the microfluidic flow cell.

15. The method of claim 14, further comprising removing fluid from the fluid outlet block.

16. The method of claim 14, further comprising imaging a biological specimen disposed in the microfluidic flow cell.

* * * * *